(12) United States Patent
Bradley et al.

(10) Patent No.: US 10,935,749 B2
(45) Date of Patent: Mar. 2, 2021

(54) INSTALLATION OF SMALL FORM FACTOR FIBERS AT USER PREMISES

(71) Applicant: OFS Fitel, LLC, Norcross, GA (US)

(72) Inventors: Kelvin B Bradley, Lawrenceville, GA (US); John E George, Cumming, GA (US); Daniel Hendrickson, Roswell, GA (US); Willard C White, Suwanee, GA (US); Roger A Vaughn, Greer, SC (US)

(73) Assignee: OFS FITEL, LLC, Norcross, GA (US)

( * ) Notice: Subject to any disclaimer, the term of this patent is extended or adjusted under 35 U.S.C. 154(b) by 160 days.

(21) Appl. No.: 16/366,541

(22) Filed: Mar. 27, 2019

(65) Prior Publication Data

US 2020/0158979 A1    May 21, 2020

Related U.S. Application Data

(60) Provisional application No. 62/805,603, filed on Feb. 14, 2019, provisional application No. 62/769,753, filed on Nov. 20, 2018.

(51) Int. Cl.
*G02B 6/46* (2006.01)
*B05C 17/005* (2006.01)

(52) U.S. Cl.
CPC ............ *G02B 6/46* (2013.01); *B05C 17/0052* (2013.01); *B05C 17/00593* (2013.01)

(58) Field of Classification Search
CPC .. G02B 6/46; B05C 17/0052; B05C 17/00593
See application file for complete search history.

(56) References Cited

U.S. PATENT DOCUMENTS

| | | | |
|---|---|---|---|
| 8,792,766 B2* | 7/2014 | Hendrickson | B65H 57/26 385/135 |
| 9,835,817 B2 | 12/2017 | Burek et al. | |
| 10,746,951 B2* | 8/2020 | Bradley | G02B 6/4466 |
| 2012/0138214 A1* | 6/2012 | Burek | G02B 6/4457 156/166 |
| 2013/0020015 A1* | 1/2013 | Dickinson | B65H 57/26 156/166 |
| 2018/0348465 A1 | 12/2018 | Bradley et al. | |

* cited by examiner

*Primary Examiner* — Jeffry H Aftergut
(74) *Attorney, Agent, or Firm* — Law Offices of Leo Zucker, Esq.

(57) ABSTRACT

A guide tool device for an optical fiber or cord includes a tool base that mounts on an adhesive syringe. A cord guide head has a flat leading edge, a key removably insertable into a keyway in the tool base, a guide channel for guiding a fiber toward the leading edge, and a tube for receiving an adhesive. An opening in the guide channel communicates adhesive from the tube into the channel, for applying the adhesive along a fiber while it is guided toward the leading edge on the guide head. A fitting is arranged to connect in sealing relationship with a distal end of the syringe, and a flexible tubing is connected between the fitting and the other end of the tube on the cord guide head. When urged toward the distal end of the syringe, the adhesive is communicated into the guide channel in the cord guide head.

16 Claims, 8 Drawing Sheets

INSTALLATION OF SMALL FORM FACTOR FIBERS AT USER PREMISES

CROSS REFERENCE TO RELATED APPLICATIONS

This application claims priority under 35 U.S.C. § 119(e) of U.S. Provisional Patent Applications No. 62/769,753 filed Nov. 20, 2018, and No. 62/805,603 filed Feb. 14, 2019, both of which are incorporated by reference in their entireties.

BACKGROUND OF THE INVENTION

Field of the Invention

The present invention concerns methods and tools for routing and installing an optical fiber inside the premises of fiber optic network users.

Discussion of the Known Art

Desktop optical network terminals (ONTs) are being deployed at an increasing rate inside the premises of fiber optic network users. ONTs are usually placed on a desk or shelf inside the premises near a TV set top box, cable modem, or other electronic device to which the ONT is connected so it can interface the device with the network.

As used herein, the term premises means a home, an office, an apartment, or other living unit where a user of a fiber optic network resides and uses services provided by the network, e.g., Internet access, telephony, television, voice and music broadcasts, and/or other information and data streams that require the routing and installation of one or more optical fibers inside the premises. Also, the terms fiber, optical fiber, and cord are used interchangeably herein to connote an optical fiber that is buffered and/or jacketed, as well as a fiber optic cable that contains one or more optical fibers.

Moreover, the term small form factor fiber as used herein refers to a fiber having an outside diameter between approximately 400 µm and 700 µm. For example, a 20 meter length of spooled 600 um O.D. buffered fiber, suitable for installation at user premises as described herein, is commercially available from OFS Fitel, LLC, as part no. 301147609.

Conventional staples can be used to secure a fiber to a wall, a wall molding, or other exposed and accessible structural surfaces at a premises to minimize installation time and incur relatively low cost. Many users reject stapled installations, however, and opt instead for special moldings or conduits to conceal the fiber at their premises. Staples can also physically damage walls and moldings, and impair or break a fiber if not properly installed. Some users also prefer to hide all wires and fibers completely at their premises, thereby incurring expensive hardware with increased installation time.

Accordingly, a procedure that enables an installer to route and bond an optical fiber quickly, properly, and safely along structural surfaces, grooves, and/or corners inside user premises with little if any visibility, is very desirable. A solution offered by OFS Fitel, LLC, under the registered mark InvisiLight® fulfills this need by providing fast, easy, and virtually invisible fiber installations using a consumer grade, low odor, nonhazardous, water based adhesive to bond optical fibers to walls and ceilings indoors. Water based adhesives are preferred since they are typically non-toxic, allow clean up with soap and water, and can be shipped worldwide without restriction. As demand for InvisiLight installations has spread, users have expressed a desire that the installation time be reduced even more by addressing the following concerns.

Currently, an installer must move and climb a ladder multiple times. First, he or she deposits an adhesive bead over successive elevated portions of the routing path by repositioning and climbing the ladder to reach the ceiling or a molding at each portion, while at the same time holding onto an adhesive dispensing gun. To deposit the adhesive bead, the installer squeezes the gun trigger one or more times to cause a plunger inside the syringe to urge the adhesive out of an applicator nozzle.

Once the adhesive bead is deposited over the entire routing path, the installer repeats the first series of ladder movements, climbing the ladder again at each elevated portion of the path where the installer manually presses the fiber into the bead. At many premises, however, large furniture (e.g., sofas and entertainment centers) is located directly beneath elevated portions of the routing path, thus making it difficult for the installer to use the ladder safely at such locations.

FIG. 1 shows an extensible adhesive dispensing gun system 10 which is disclosed in U.S. Patent Application Pub. No. 2018/0345313 (Dec. 6, 2018) and is assigned to the present applicant. The system enables an installer to apply an adhesive bead along ceilings and crown moldings while standing on the floor at the premises. The system includes an adhesive dispensing gun 12, an outer extension tube 14, an inner rod 16 extending axially inside the extension tube 14 with a plunger head at a distal end of the rod 16, a syringe adapter 18 at a distal end of the extension tube 14, and a syringe 20 having a piston 22 for dispensing an adhesive out of a syringe nozzle 24.

To apply an adhesive bead, an installer squeezes a trigger 26 on the gun 12 one or more times to cause a plunger 28 of the gun to advance against the inner rod 16 which, in turn, urges the piston 22 inside the syringe 20 to dispense the adhesive out of the nozzle 24. A plunger head at the end of the rod 16 applies uniform forward and outward pressure to a thin-walled, trailing end of the piston 22 which helps to seal the piston against the inner wall of the syringe 20, thus ensuring a reliable and consistent application of an adhesive bead from the nozzle 24.

FIG. 2 shows a cord guide tool 40 which is also shown in FIG. 10 of commonly owned U.S. Patent Application Pub. No. 2018/0348465 (Dec. 6, 2018). As seen in FIG. 3 of the present application, when attached to a distal end of the syringe 20 in the extensible dispensing gun system 10 of FIG. 1, the guide tool 40 enables an installer to embed a fiber neatly and precisely into an adhesive bead deposited near a ceiling without a ladder. The cord guide tool 40 has a flat leading edge 42 sized so that when urged across a corner between adjacent walls, a wall and a ceiling, or a wall and a molding, the space defined between the leading edge 42 and the corner is relatively small. When an adhesive bead is deposited along the corner, and a fiber is oriented to pass between the leading edge 42 of the guide tool 40 and the corner, the tool em beds the fiber into the bead.

U.S. Pat. No. 9,835,817 (Dec. 5, 2017), also assigned to the present applicant and incorporated by reference, describes a tool for embedding an optical fiber in an adhesive bead deposited along a structural corner in a building room or hallway, without a ladder. The patented tool has a trough for receiving and containing a fiber, a guide channel at a downstream end of the trough that is arranged to retain the fiber, and a nose at a downstream end of the channel for embedding the fiber in the bead when an installer uses a pole to sweep the tool nose over and against the bead.

To facilitate an even faster installation while minimizing ladder use, several problems need to be solved. First, an extensible adhesive dispensing gun system like the system 10 in FIG. 1 which eliminates the need for a ladder during adhesive application, is required. Also required is a device that allows the fiber to be positioned along the routing path at the same time the adhesive is dispensed, thereby eliminating the need for the installer to traverse the routing path twice (i.e., first for adhesive dispensing and again for fiber installation). Finally, a small form factor fiber that is light enough to be retained within an uncured adhesive bead is needed so that the weight of an uninstalled length of fiber, which may at times be left hanging to the floor before an installation is completed, will not cause a previously installed length of the fiber to be urged out of a bead that is not yet fully cured.

For example, an uninstalled length of fiber may be left hanging to the floor if the installer pauses before completing the entire installation due to unplanned interruptions such as, e.g., restroom breaks, phone calls, etc. The typical floor-to-ceiling height in a user premises is eight feet. On average, the weight of a conventional 900 um O.D. buffered fiber, which is often used in fiber installations at user premises, is $6.2 \times 10^{-4}$ lb/ft. This results in a downward peel force of approximately 0.005 lb being applied to the fiber retained in the uncured adhesive bead. If the uncured bead cannot overcome the force, the retained fiber will be pulled out of the bead unless it is secured by tape at one or more locations along the deposited bead.

SUMMARY OF THE INVENTION

According to the invention, a guide tool device for an optical fiber or cord includes a tool base configured to mount on the circumference of an adhesive syringe, and the tool base has a keyway for receiving a key. An inclined cord guide head has a flat leading edge, the key which is removably insertable in the keyway in tool base, a guide channel for receiving and guiding a supplied fiber toward the leading edge of the guide head, and a tube for receiving an adhesive. The guide channel has an opening for communicating adhesive received in the tube into the guide channel, so that the adhesive is deposited along the fiber as it is guided toward the leading edge of the guide head.

The guide tool device also includes a fitting that connects in sealing relationship with a distal end of the adhesive syringe; and a length of tubing that connects at one end with the fitting and at the other end with the tube on the cord guide head. Thus, when an adhesive in the syringe is urged toward the distal end of the syringe, the adhesive flows from the syringe and into the guide channel in the cord guide head.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
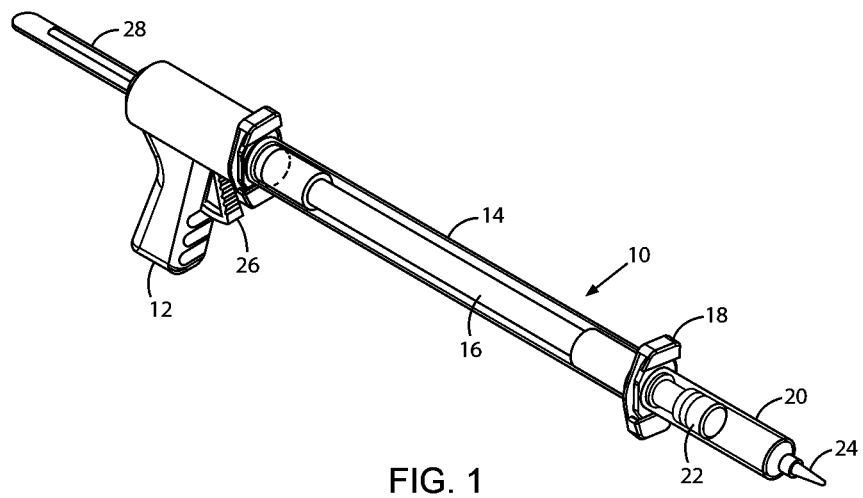
FIG. 1 is an isometric view of an extensible adhesive dispensing gun system.
Figure 2:
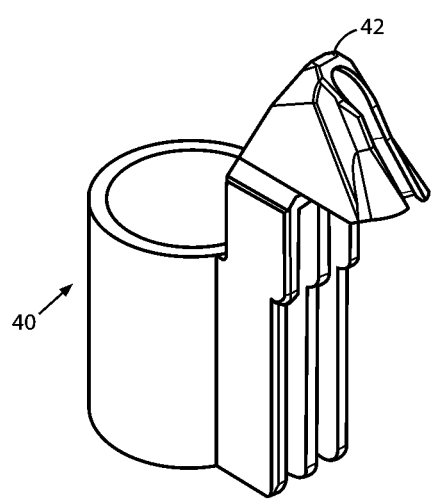
FIG. 2 is an isometric view of a cord guide tool.
Figure 3:
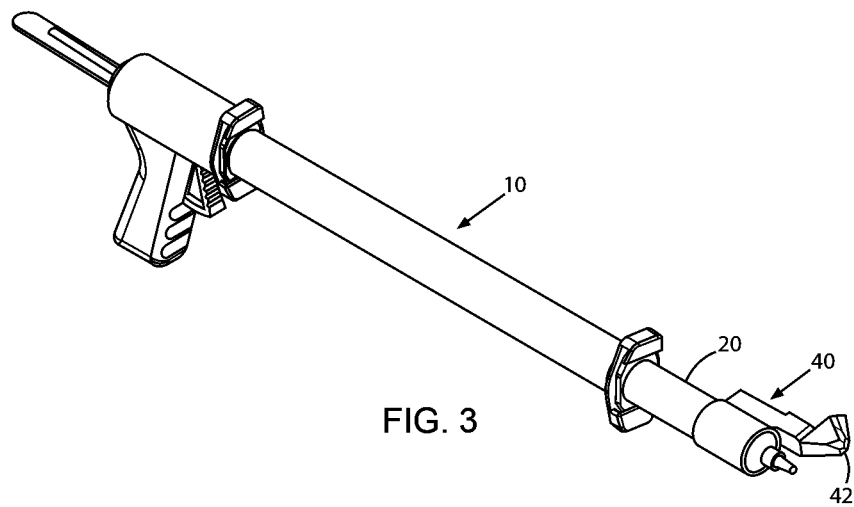
FIG. 3 is a view of the adhesive dispensing gun system in FIG. 1, with the cord guide tool in FIG. 2 attached to an adhesive syringe at a distal or far end of the system.

To address the earlier mentioned issues concerning installations of 900 μm buffered fiber in which the fiber is embedded in a adhesive bead, it has been discovered that a small form factor fiber as defined herein exhibits (i) improved resistance to acquiring a permanent set when the fiber is spooled prior to installation, as explained below, (ii) reduced weight, and (iii) increased density relative to 900 μm fiber when both types of fiber are supplied on identical spools.

In particular, it was found that when a spooled 900 μm buffered fiber is unwound, the fiber exhibits some memory or set because the elastic limit of the buffer coating, which typically is a polymeric material, was exceeded at the time the fiber was initially wound onto a supply spool. That is, when the fiber is wound about the spool hub, stresses are induced in the fiber windings which cause corresponding strains within the buffer coating. The stresses vary with the curvature of the windings, being greatest in the windings closer to the hub. Also, for a given winding, the maximum stress is at the outer circumference of the buffer coating on the winding.

It can be shown that by reducing the outside diameter of a buffered fiber from 900 μm to 600 μm, the maximum stress on the buffer coating is reduced by 32.6% if the fiber is wound on a spool with a one inch diameter hub. Moreover, for a buffered fiber having an O.D. ranging from approximately 400 μm to 700 μm, it can be shown that the maximum stress is reduced by at least 20% when the fiber is wound on a spool whose hub diameter is in the range of about 1.0 to 1.65 in. Such decreases in maximum stress will therefore reduce the likelihood that a small form factor buffered fiber will exhibit a permanent set after the fiber is unspooled during installation.

Further, the reduced weight of a small form factor buffered fiber eliminates the need to apply a tape over an installed length of fiber when the adhesive bead in which the length is embedded has not yet cured. That is, the weight of an uninstalled, loose hanging small form factor fiber would not be sufficient to pull the installed length of fiber out of the uncured bead.

For example, a 600 μm O.D. buffered fiber can weigh only $2.7 \times 10^{-4}$ lb/ft, which is 56% less than the weight of a typical 900 μm O.D. buffered fiber ($6.2 \times 10^{-4}$ lb/ft as noted earlier). This results in a downward peel force of only approximately 0.002 lb for the 600 um fiber, which is not likely to be enough to overcome the adhesive retention capability of an uncured adhesive bead in which an installed length of fiber is embedded. Thus, if an uninstalled length of 600 μm fiber is left hanging eight feet to the floor inside a user premises, the weight of the hanging fiber will not cause an installed length of the fiber to pull out of an uncured bead. This feature greatly facilitates the overall fiber installation process at the premises, and saves valuable time.

A small form factor fiber will also address issues related to spool density or capacity. When installers arrive at a given user premises, they usually do not know the exact dimensions or layout of the premises through which the fiber is to be routed, and in which related components such as fiber storage modules and ONTs are to be placed. It is therefore important to have enough fiber available for the installers to complete the installation regardless of the premises floor plan, while minimizing the volume needed for storage modules to contain excess fiber that remains unwound from the supply spool.

For a given fiber diameter, the capacity of a supply spool is limited by the radius of the spool hub, the width of the hub, and the height of the spool flanges at the axial ends of the hub. The geometry of the spool is further constrained by the space available within a given storage module, and the optical characteristics of the fiber, namely, its optical bend-loss performance. To ensure optimal aesthetics, low-profile modules such as one available from OFS Fitel, LLC, and known as an InvisiLight 80×80 module, are used. Reducing the outer diameter of the fiber to be stored in the module from 900 μm to 600 μm will therefore more than double the spool capacity, allowing longer lengths of the fiber to be deployed and stored on a low-profile spool which can then be stored inside a corresponding low-profile module like the mentioned InvisiLight 80×80 module.

Still another desirable feature of a small form factor buffered fiber is that its reduced diameter makes the fiber less visible than a standard 900 μm fiber when installed. The reduced visibility results in a more aesthetically pleasing installation.

Figure 4A:
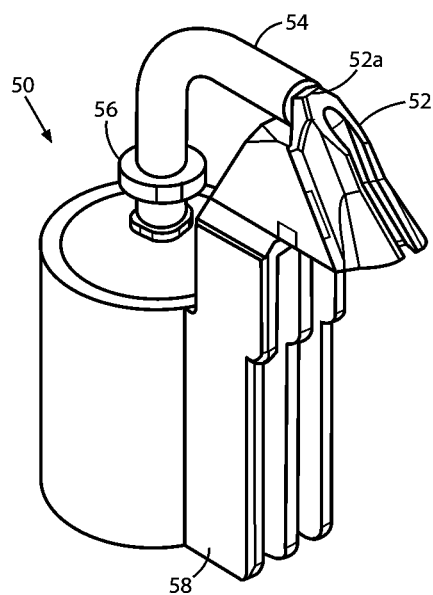
FIG. 4A is an isometric view of a fiber cord guide tool device according to the invention.
Figure 4B:
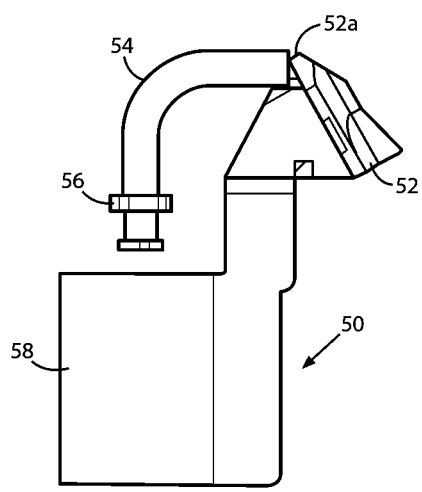
FIG. 4B is an elevational view of the inventive guide tool device in FIG. 4A.

In accordance with the invention, a small form factor buffered fiber, for example, the commercially available fiber identified above with an O.D. of 600 μm, is embedded and retained in an adhesive bead deposited along a desired installation path at a user premises. The installation is performed using a fiber cord guide tool device 50 that is shown in FIGS. 4A, 4B, and 5-12, and described below. The device enables an installer to position the fiber along a desired routing path while simultaneously depositing the adhesive bead. As seen in FIGS. 4A and 4B, the inventive guide tool device 50 includes a base 58 that is configured to mount on the circumference of the adhesive syringe 20, an inclined cord guide head 52, a length of flexible rubber or plastics tubing 54 (shown bent), and a barbed female Luer lock fitting 56.

Figure 5:
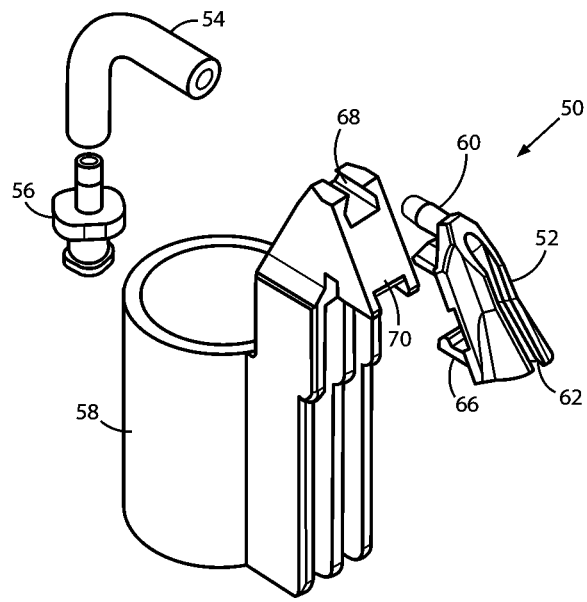
FIG. 5 is an exploded view of the inventive guide tool device in FIG. 4A.

FIG. 5 is an exploded view of the cord guide tool device 50. The cord guide head 52 has a barbed tube 60 through which an adhesive is urged to flow to be deposited along a length of fiber as the fiber is directed through a guide channel 62 in the cord guide head 52. The cord guide head 52 has a key 64 and a cantilever snap latch 66, which facilitate the attachment of the cord guide head 52 to the tool base 58.

Figure 6A:
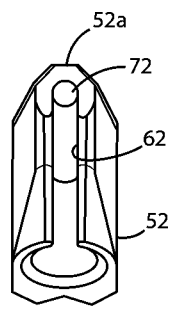
FIG. 6A is an elevational view of a cord guide head of the inventive guide tool device.
Figure 6B:
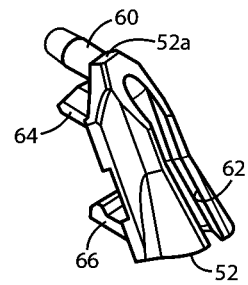
FIG. 6B is an isometric view looking from the front of the cord guide head in FIG. 6A.
Figure 6C:
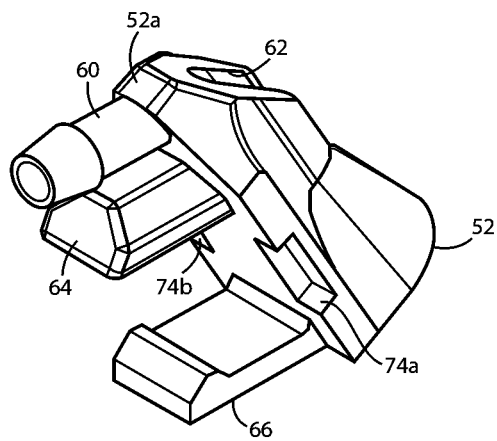
FIG. 6C is an enlarged isometric view looking from the rear of the cord guide head in FIG. 6A.

The tool base 58 has a complementary keyway 68 formed along a top surface of the base 58 to receive the key 64, and a catch 70 for engaging with and retaining the latch 66 on the guide head 52 when the guide head key 64 is fully inserted in the keyway 68 atop the tool base 58. FIGS. 6A to 6C are additional views of the cord guide head 52, including the barbed tube 60, the fiber guide channel 62, an adhesive exit opening 72 (FIG. 6A) formed in the guide channel 62 to communicate adhesive when urged through the tube 60 into the channel 62; the key 64, and the snap latch 66.

The barbed tube 60 is configured to retain one end of the flexible tubing 54 as seen in FIGS. 4A and 4B. The surface of the latch 66 on the cord guide head 52 that engages the catch 70 on the tool base 58, is chamfered to allow the guide head 52 to disengage from the tool base 58 for cleaning or replacement after use. The cord guide head 52 also has cutouts 74a, 74b formed in opposite sides of the head 52. The cutouts 74a, 74b are sized to receive a flat blade of a standard screwdriver, so users can use the screwdriver to help remove the guide head 52 from the tool base 58 by gently prying the guide head 52 away from the tool base.

Figure 7:
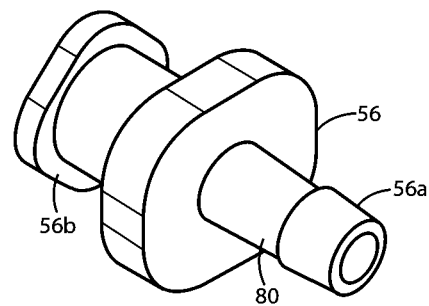
FIG. 7 is an isometric view of a Luer lock fitting on the inventive cord guide tool device.
Figure 8:
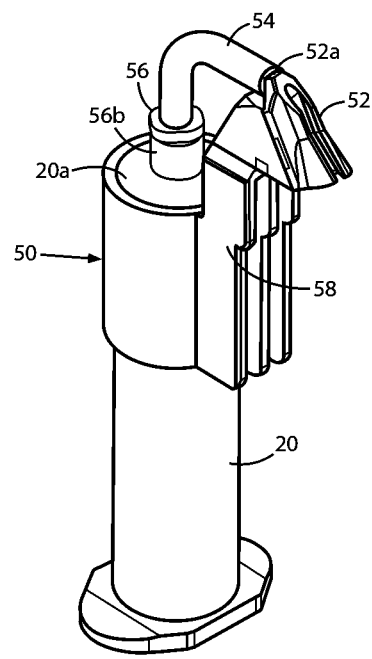
FIG. 8 shows the cord guide tool device mounted on a distal end of an adhesive applicator syringe according to the invention.

FIG. 7 is an enlarged view of the Luer lock fitting 56. The fitting 56 is configured at one end 56a with a barbed tube 80 to retain the end of the flexible tubing 54 opposite the end of the tubing retained on the tube 60 of the cord guide head 52. The opposite end 56b of the fitting 56 is configured to engage and communicate with the distal end of the adhesive syringe 20 in FIG. 1. Instead of the syringe nozzle 24, and as shown in FIG. 8, the distal end 20a of the syringe 20 is adapted and configured to engage the end 56b of the fitting 56 in tight sealing relationship so that when urged by the dispensing gun system 10 in FIG. 1, an adhesive contained in the syringe will flow through the lock fitting 56, the tubing 54, and into the channel 62 in the cord guide head 52.

Advantageously and for expediency, after a fiber installation as described herein is complete, installers may opt to discard the cord guide head 52, the flexible tubing 54, and the Luer lock fitting 56, in lieu of taking time to clean deposited adhesive off of these items. Once the adhesive cures inside these items, they cannot be readily reused. The tool base 58 can be used again, however, once a new guide head 52 including the tubing 54 and the fitting 56 are attached to the tool base and to distal end 20a of the same or a new adhesive syringe 20.

Figure 9:
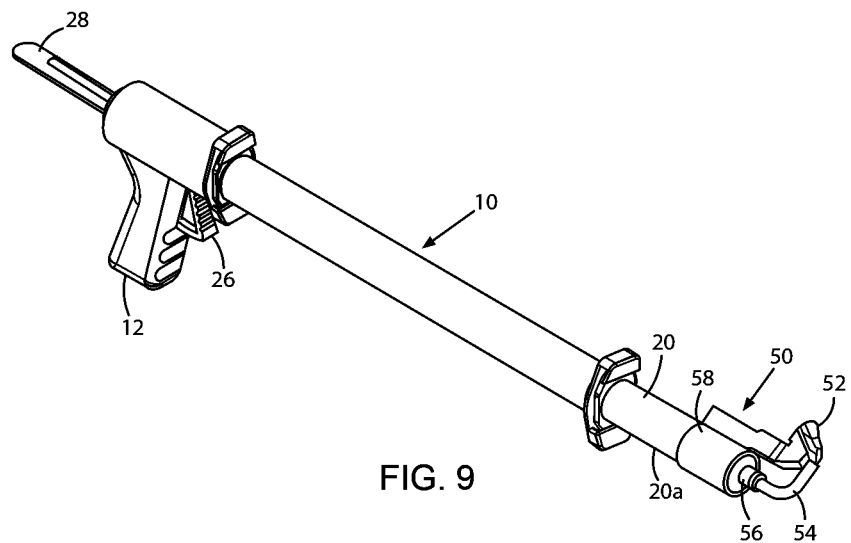
FIG. 9 shows the adhesive applicator syringe mounted at the distal end of the extensible adhesive dispensing gun system in FIG. 1, with the cord guide tool device mounted on the syringe as in FIG. 8.

As seen in FIG. 9, when attached to the distal end 20a of the syringe 20 in the dispensing gun system 10 in FIG. 1, the inventive cord guide tool device 50 will enable an installer to dispense an adhesive bead near a ceiling without a ladder, while simultaneously embedding a fiber neatly and precisely into the adhesive bead. The cord guide head 52 has a flat leading edge 52a sized so that when swept across a corner between adjacent walls, a wall and a ceiling, or a wall and a molding, the space defined between the leading edge and the corner is relatively small. While the adhesive is being urged into the channel 62 in the guide head 52, it is deposited onto and along the fiber after the fiber enters the channel 62, as described below. The adhesive, together with the fiber which is embedded in the adhesive, can therefore be deposited at once by the guide head 52 as the guide head 52 is swept across the corner by an installer.

Figure 10:
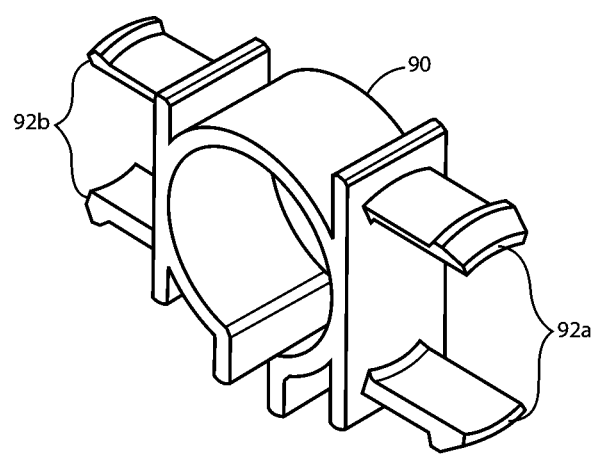
FIG. 10 is an isometric view of a retention clip for supporting a fiber supply spool on an outer extension tube of the dispensing gun system in FIG. 9.
Figure 11:
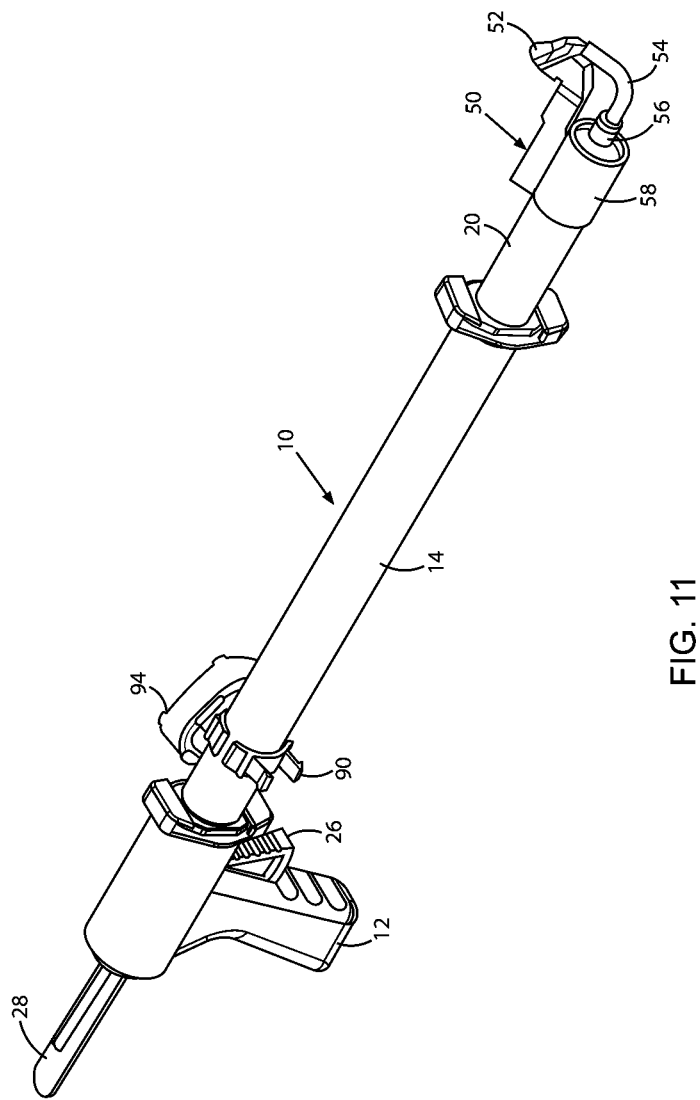
FIG. 11 shows the retention clip in FIG. 10 mounted with a retained fiber supply spool mounted at a proximal end of the dispensing gun system in FIG. 9.
Figure 12:
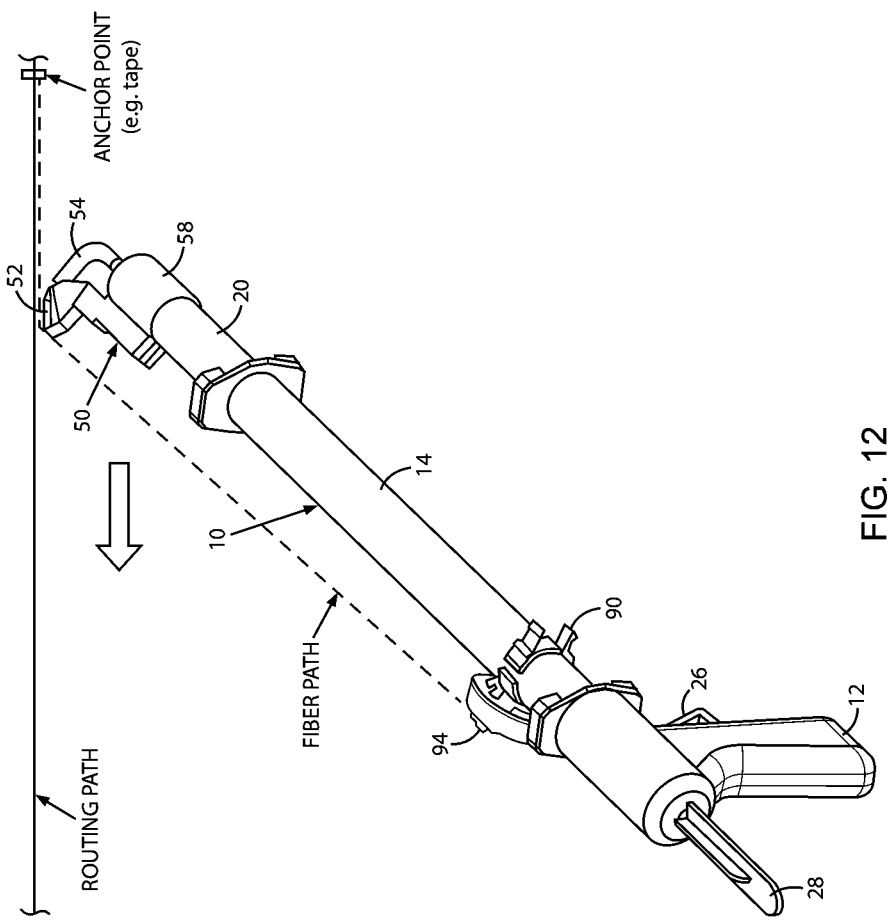
FIG. 12 shows the dispensing gun system in FIG. 11 as viewed from the proximal end of the system.

FIG. 10 shows a generally circular spool retention clip 90 having two pairs of arcuate spool retaining fingers 92a, 92b extending from opposite sides of the clip. Each pair of fingers 92a, 92b is sized to receive and support the hub of a fiber supply spool 94 (see FIGS. 11 and 12) while allowing the spool to rotate freely around its axis. One pair of fingers (e.g., 92a) is sized for a low-profile supply spool, and the opposing pair (e.g., 92b) is sized for larger, high-capacity supply spools. The clip 90 may be made of plastics or an equivalent resilient material so it can be opened and firmly mounted on the circumference of the outer tube 14 of the dispensing gun system 10, near the proximal end of the system 10 as shown in FIGS. 11 and 12. That is, the inside diameter of the clip 90 is less than the outside diameter of the outer tube 14 of the system 10, so that the clip 90 is restrained from movement relative to the tube 14 once the clip 90 is positioned as desired.

FIG. 11 shows the spool retention clip 90 positioned on the outer tube 14 of the dispensing gun system 10, with the fiber supply spool 94 attached. FIG. 12 illustrates the path (in dashed lines) of the fiber from the mounted spool 94, through the guide head 52 of the tool device 50 at the far end of the adhesive dispensing system 10, and along an elevated routing path, while the device 50 is being swept over the path by an installer.

As mentioned earlier, and for the guide tool device 50 to work optimally, a small form factor fiber should be used wherein the fiber is light enough so that the weight of an uninstalled, hanging length of the fiber will not cause a previously installed length of the fiber to pull out of an uncured bead in which the fiber was embedded.

EXAMPLE

The following is an example of steps for installing an optical fiber at user premises, according to the invention. The steps are exemplary only, and are not meant to limit the scope of the invention.

1. Attach the cord guide tool device 50 to the distal end 20a of the adhesive syringe 20 of dispensing gun system 10, wherein the distal end 20a of the syringe has been adapted as described above. The inclined head of the cord guide head 52 should be facing in the direction the fiber is to be routed.

2. Remove the syringe cap, if present, and attach the Luer lock fitting 56 to the syringe.

3. Attach the fiber supply spool 94 to the spool retention clip 90 on the outer tube 14 of the dispensing gun system.

4. Unspool enough fiber to establish an anchor point at a desired starting point along the desired installation route.

5. Align the fiber within the fiber guide channel 62 of the cord guide head 52, then gently slide the guide head 52 up the fiber until the guide head reaches the anchor point.

6. Tilt the guide head 52 as needed to ensure the flat leading edge 52a of the head will maintain sliding contact as the head is swept between adjacent walls, a wall and a ceiling, or a wall and a molding, depending on the desired route.

7. Pull the trigger of the dispensing gun system 10 slowly and repeatedly to dispense adhesive, as needed, while sweeping the cord guide head 52 of the guide tool device 50 along the desired route to deploy, position, and embed the fiber within the adhesive bead as the bead is being deposited.

As described herein, the inventive guide tool device 50 operates to deposit an adhesive onto a supplied buffered fiber which preferably has a small form factor, and to dispense the adhesive with the fiber embedded therein along structural corners at a user premises, including corners that are elevated and would otherwise require a ladder to reach. The tool device 50 deposits a straight and neat adhesive strip in which a small form factor buffered fiber stays firmly embedded, notwithstanding peel forces that may be applied to the fiber before the adhesive cures. Moreover, the structure of the tool device 50 is such that parts of the device in which adhesive may accumulate and harden after use, can be easily and quickly removed from the device and replaced at minimal cost.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A guide tool device for an optical fiber or cord, comprising:

a tool base configured to mount on the circumference of an adhesive syringe, wherein the tool base has a keyway for receiving a key on another part of the guide tool device;

an inclined cord guide head having a flat leading edge, a key which is configured to be removably insertable in the keyway in the tool base, a guide channel for guiding a supplied fiber toward the leading edge of the guide head, and a tube for receiving an adhesive, wherein the guide channel has an opening for communicating adhesive received in the tube into the guide channel so that the adhesive is deposited along the supplied fiber as the fiber is guided toward the leading edge of the guide head;

a fitting constructed and arranged to connect in sealing relationship with a distal end of the adhesive syringe; and a length of tubing arranged to connect at one end with the fitting and at the other end with the tube on the cord guide head, so that when an adhesive contained in the syringe is urged toward the distal end of the syringe, the adhesive flows from the syringe and into the guide channel in the cord guide head.

2. A guide tool device according to claim 1, wherein the tool base has a catch, and the cord guide head includes a latch for engaging the catch on the tool base.

3. A guide tool device according to claim 2, wherein the key and the latch on the cord guide head are configured so that after the key is inserted in the keyway and the latch engages the catch on the tool base, the cord guide head can be separated from the tool base to be replaced by a like cord guide head.

4. A guide tool device according to claim 1, including a spool retention clip for mounting on the circumference of an outer tube of an adhesive dispensing gun system, wherein the clip has one or more retaining fingers for supporting a hub of a fiber supply spool.

5. A guide tool device according to claim 4, including a supply spool containing a small form factor fiber, and the spool has a hub dimensioned to be supported on the retaining fingers of the retention clip.

6. A system for installing an optical fiber along a desired routing path at a user premises, comprising:

an extensible adhesive dispensing gun system including:
a dispensing gun;
an outer tube extending from an end of the gun;
an inner rod extending axially inside the outer tube, wherein the rod is arranged to advance in the axial direction by operation of the dispensing gun; and
an adhesive syringe mounted at a distal end of the outer tube and having a piston for dispensing an adhesive contained in the syringe from a distal end of the syringe when the rod inside the outer tube is advanced; and
a guide tool device according to claim 1;
wherein the guide tool device is mounted on a circumference of the adhesive syringe, and the fitting of the tool device is connected to the distal end of the syringe.

7. A system for installing an optical fiber according to claim 6, including a spool retention clip for mounting on the circumference of the outer tube of the adhesive dispensing gun system, wherein the clip has one or more retaining fingers for supporting a hub of a fiber supply spool.

8. A system according to claim 7, including a supply spool containing a fiber to be installed at the user premises, and the spool has a hub dimensioned to be supported on the retaining fingers of the retention clip.

9. A system according to claim 8 wherein the supply spool contains a small form factor fiber.

10. A system for installing a small form factor optical fiber along a desired routing path at a user premises, comprising:
an extensible adhesive dispensing gun system including:
a dispensing gun;
an outer tube extending from an end of the gun;
an inner rod extending axially inside the outer tube, wherein the rod is arranged to advance in the axial direction by operation of the dispensing gun;
an adhesive syringe mounted at a distal end of the outer tube and having a piston for dispensing an adhesive contained in the syringe from a distal end of the syringe when the rod inside the outer tube is advanced; and
a guide tool device having a leading edge for depositing an adhesive bead together with a small form factor optical fiber along a desired routing path at a user premises, wherein the guide tool device is constructed and arranged to mount on the distal end of the adhesive syringe so that the adhesive contained in the syringe is deposited by the device with a supplied small form factor fiber along the routing path as the adhesive is being dispensed from the syringe; and
a spool retention clip for mounting on the adhesive dispensing gun system, wherein the clip is constructed and arranged for supporting a supply spool containing a small form factor fiber.

11. A system according to claim 10, including the supply spool containing the small form factor fiber, wherein the spool has a hub dimensioned and configured for rotation while supported on the spool retention clip.

12. A system according to claim 11, wherein the diameter of the small form factor fiber contained on the supply spool ranges from about 400 microns to about 700 microns.

13. A system according to claim 11, wherein the weight per unit length of the fiber is sufficiently light so that while the fiber is being installed with an uncured adhesive bead along an elevated routing path at a user premises, an uninstalled length of the fiber can hang freely to a floor at the premises without causing the installed fiber to peel away from the uncured bead.

14. A system according to claim 13, wherein the uninstalled length of the fiber is approximately eight feet.

15. A system according to claim 11, including a low profile module for storing the supply spool with any of the small form factor fiber remaining on the spool when the installation is finished.

16. A system according to claim 11, wherein the diameter of the small form factor fiber contained on the supply spool is approximately 600 microns.

* * * * *